United States Patent

Somers

[11] Patent Number: 5,291,363
[45] Date of Patent: Mar. 1, 1994

[54] MAGNETIC HEAD PROVIDED WITH A FLUX GUIDE AND A MAGNETORESISTIVE ELEMENT

[75] Inventor: Gerardus H. J. Somers, Eindhoven, Netherlands

[73] Assignee: U.S. Philips Corporation, New York, N.Y.

[21] Appl. No.: 827,191

[22] Filed: Jan. 28, 1992

[30] Foreign Application Priority Data

Jan. 30, 1991 [NL] Netherlands ......................... 9100155

[51] Int. Cl.$^5$ ................................................ G11B 5/39
[52] U.S. Cl. ..................................................... 360/113
[58] Field of Search ........................................ 360/113

[56] References Cited

U.S. PATENT DOCUMENTS 5,155,644 10/1992 Kira et al. ............................ 360/113
5,159,511 10/1992 Das ...................................... 360/113

FOREIGN PATENT DOCUMENTS 62-257612 10/1987 Japan .

Primary Examiner—Robert S. Tupper
Attorney, Agent, or Firm—Norman N. Spain

[57] ABSTRACT

A magnetic head (1) for reading information comprises a magnetoresistive element (21) which is arranged between two flux guides (7, 9) present on a support and is partly located on thinner ends (25, 27) of the flux guides. The flux guides are composed of a basic layer (13, 15) and a main layer (17, 19) which partly covers the basic layer. Subsequently the magnetoresistive element is partly provided on the parts (25, 27) of the basic layer which have been left free by the main layer so that the magnetoresistive element is magnetically coupled to the flux guides via coupling parts (20, 22).

2 Claims, 1 Drawing Sheet

MAGNETIC HEAD PROVIDED WITH A FLUX GUIDE AND A MAGNETORESISTIVE ELEMENT

BACKGROUND OF THE INVENTION

The invention relates to a magnetic head having a head face and comprising a support which has a support face, a magnetoresistive element spaced apart from the tape contact face, and a flux guide being adjacent to the head face and having one end portion which is thinner than another portion of the flux guide.

A magnetic head with a magnetoresistive element (MRE) which is located at some distance from the tape contact face and in which a flux guide is present between the head face and the MRE—the so-called "yoke-MRH"—is known per se and is used for reading information which is present in a magnetic information carrier. Magnetic flux from the information carrier is passed through the MRE via the flux guide, resulting in a change of the resistance of the MRE, which resistance change is converted into a read signal.

A general structure of a "yoke-MRH" is known from JP-A 62-241119 (herewith incorporated by reference). The MRE is present between a magnetic substrate and two flux guides which are present on this substrate. Due to the small distance between the MRE and the magnetic substrate in this structure, a part of the flux provided by the information carrier will perpendicularly cross the MRE during reading instead of being guided parallel to the element through the MRE, which may cause a distortion of the read signal. If this MRE is provided with strip-shaped electric conductors, a barber pole structure, a relief, particularly a wave-shaped relief will be produced in that part of the flux guide which is present on the MRE. This relief may also cause distortion of the read signal.

Another general structure of a "yoke-MRH" is known from JP-A 62-246115 (herewith incorporated by reference). In this structure the MRE, as viewed from the substrate, is partly located on the flux guides—instead of between the substrate and the flux guides—so that the above-mentioned causes of distortion of the read signal do not occur. In this structure the base on which the MRE is provided is first planarized before providing the MRE. This is achieved by filling up the space between the two flux guides. If this were not done, the MRE could show discontinuities, for example, in the form of cracks due to the large relief so that its operation is influenced detrimentally. However, planarization requires an extra process step, thus resulting in an increase of the manufacturing time and the manufacturing costs.

A magnetic head described in the opening paragraph is known from JP-A 62-46420 (herewith incorporated by reference). Since in this known magnetic head the MRE is provided between the flux guides, a planarization step is not required. However, a drawback of this structure is that the MRE has a large relief so that this structure also has the previously mentioned drawbacks of this large relief. A further drawback of this structure is that due to the large relief serious problems will be encountered if a barber pole structure is also to be provided on the MRE.

OBJECTIVES AND SUMMARY OF THE INVENTION

It is an object of the invention to provide a magnetic head if the type described in the opening paragraph with a substantially plane MRE, which the above-mentioned causes of distortion of the read signal are not present.

For this purpose the magnetic head according to the invention is characterized in that the thinner end portion of the flux guide has a base layer which is at least substantially parallel to and remote from the support face, while a coupling part of the magnetoresistive element is located on that base layer. Due to the thinner end portion a reasonably planar substrate is obtained on which the MRE can be provided without any problem. By means of said end portion a satisfactory magnetic coupling with the remaining part of the flux guide is obtained. A "yoke-MRH" generally has such a construction that the magnetic head has a further flux guide which, viewed in a direction perpendicular to the head face, is spaced apart from said flux guide on the support.

An embodiment of the magnetic head according to the invention is, with an insulation layer being provided on the support face, is characterized in that the flux guide has a base layer which is present on the insulation layer, the thinner end portion being formed by a part of the base layer and in that the flux guide also comprises a main layer which is provided on another part of the base layer on the basic face. This is an advantageous head structure with which the thinner end portion is well-defined and which may be made of a different material than the material of the main layer.

An embodiment of the magnetic head according to the invention, comprising an electric conductor arranged on the insulation layer to cooperate with the magnetoresistive element is characterized in that the magnetoresistive element is partly located opposite the electric conductor and, viewed from the head face, extends beyond the electric conductor where a further coupling part of the magnetoresistive element is located opposite the support. Such an electric conductor is often used to provide an auxiliary magnetic field in the MRE so as to shift the working range to a part which is more linear. By providing this conductor between the insulation layer and parts of the MRE, the distance between the support and said parts of the MRE is increased so that less flux will perpendicularly cross the MRE towards the support. Since this conductor is also thin, the substrate on which the MRE is provided will remain substantially planar. The small relief which is present in the MRE due to the conductor and the base layer extends in the longitudinal direction of the MRE, which enhances the stability of the domain structure in the element.

The invention also relates to a method of manufacturing a magnetic head, starting from a support on which an insulation layer is provided, whereafter a flux guide and a magnetoresistive element are provided on the insulation layer.

Such a method is known from said JP-A 64-46420. A problem regarding the relevant known method is that it is a difficult process step to provide the MRE due to the relief which is present and on which the MRE is provided. Notably the substantially vertical parts of the MRE are difficult to provide and the interfaces between the vertical parts and the horizontal intermediate parts are difficult to realise without producing discontinuities.

It is an additional object of the invention to provide a method in which the above-mentioned drawbacks do not occur.

For this purpose the method according to the invention is characterized in that firstly a base layer of the flux guide is provided on the insulation layer and subsequently a main layer of the flux guide is provided on a portion of the base layer, whereafter the magnetoresistive element is partly provided on a part of the basic layer which has been left free by the main layer. In this method a substantially plane MRE is formed, so that the above-mentioned problem does not occur. A further advantage is that the manufacture of the magnetic head according to the invention requires a minimal number of process steps for manufacturing the basic layer, because a basic layer on which the main layer of the flux guide is formed must already be provided for electrodepositing the flux guide.

BRIEF DESCRIPTION OF THE DRAWING

The invention will now be described in greater detail with reference to embodiments of the magnetic head according to the invention shown in the drawings in which.

DESCRIPTION OF THE PREFERRED EMBODIMENTS

Figure 1:
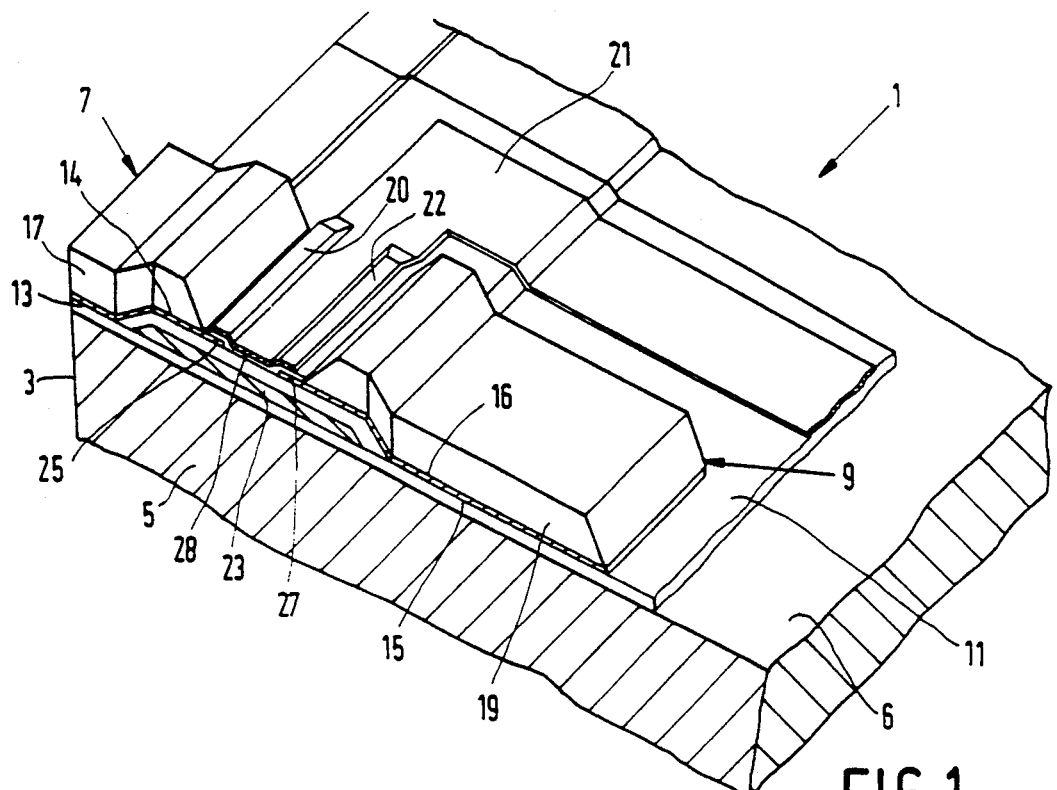
FIG. 1 is a perspective elevational view of a first embodiment of the magnetic head according to the invention, with a cross-section at the location of the flux guides.

FIG. 1 shows a first embodiment of the magnetic head 1 according to the invention. The magnetic head 1 has a head face 3 for cooperating with a magnetic information carrier. In this embodiment the magnetic head has a magnetic substrate or support 5, for example a ferrite substrate with a support face 6 which is provided with an insulation layer 11. This insulation layer 11 forms a read gap at the area of the head face 3. The insulation layer is provided with a flux guide 7 being adjacent to the tape contact face 3 and having an end portion 25, and a further flux guide 9 spaced apart from this flux guide and having a further end portion 27. Instead of the magnetic support 5, a non-magnetic substrate provided with a magnetic layer may be used as a support. The flux guide 7 and the further flux guide 9 have a base layer 13 and a further base layer 15, respectively, parts of which constitute said end portions 25 and 27 and which are provided with a base face 14 and a further base face 16, respectively, which are parallel to and remote from the support face 6. A main layer 17 and a further main layer 19, which also form part of the flux guides, are present on the base faces 14 and 16, respectively. The base layers are thin layers of magnetic and electrically conducting material, for example NiFe and function as a so-called "plating base" for the electrodeposition of the main layers. A magnetoresistive element 21 (MRE) for converting the magnetic flux—from an information carrier—into an electric measuring signal is arranged between the flux guides 7 and 9. For a satisfactory operation of the MRE it is advantageous that the MRE is located at such a distance from the magnetic support 5 that the magnetic flux from the flux guide 7 is guided via the MRE to the further flux guide 9 and that only a small quantity of magnetic flux crosses through the MRE towards the support. For this reason the MRE is arranged between the flux guides 7 and 9 instead of between the support 5 and the flux guides. To increase the distance between the support 5 and the MRE 21 even further, an electric conductor 23 is arranged between the support 5 and the MRE in this embodiment. This electric conductor 23 is used for generating an auxiliary magnetic field so that the total magnetic flux passing through the MRE is present in a more linear portion of the curve representing the relationship between the resistance of the MRE and the magnetic flux through the MRE. The electric conductor is formed, for example, by a Cu or Au layer. To be able to provide the MRE satisfactorily, it is advantageous if the substrate on which the MRE is formed is planar and has at most small height differences. For a satisfactory operation of the MRE it is also important that there is a satisfactory magnetic coupling between the MRE 21 on the one hand and the flux guides 7 and 9 on the other hand. To satisfy the condition of a plane substrate as well as a satisfactory magnetic coupling, a coupling part 20 and a further coupling part 22 of the MRE are provided on the base face 14 and on the further base face 16, respectively, at the location of a part 25 and a further part 27 of the base layers 13 and 15, which parts are left free of the main layers 17 and 19, respectively. Since the MRE and the parts 25 and 27 of the flux guides overlap each other, the magnetic coupling is realised over a larger surface area than in the case where only the edges of the MRE would be adjacent to the flux guides. Since the MRE is also present between the main layers of the flux guides and is not partly present on the main layers, the MRE is substantially plane so that, after forming the MRE, an MRE having a constant layer thickness is obtained on which conducting barber pole strips may be provided without any problems.

Forming a flux guide from a base layer and a main layer has the advantage that a part of the base layer can remain free without having to perform an additional manufacturing step, for example, an etching step. If the flux guides 7 and 9 are formed by way of electrodeposition, no additional manufacturing step is required to provide the flux guides. For the electrodeposition of the flux guides, the base layers 13 and 15 are firstly provided on the insulation layer 11. These base layers are generally sputtered and are made of a magnetic and electrically conducting material, for example NiFe. For forming the main layers 17 and 19 the base layers function as a so-called "plating base" for the electrodeposition process. In this embodiment the main layers are made of the same material (NiFe) as the base layers, but they may alternatively be made of another magnetic material such as Cr. At the location of parts 25 and 27 the base faces 14 and 16 are coated with a further insulation layer 28 so that these parts remain free. Subsequently it is possible to sputter the MRE 21 on the further insulation layer 28. A material which is often used for the insulation layers is quartz, while permalloy is often used for the MRE.

Figure 2:
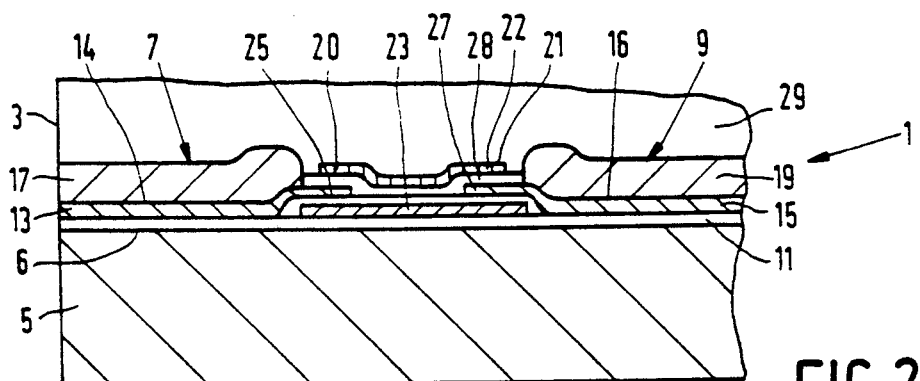
FIG. 2 is an elevational view of the cross-section of the magnetic head shown in FIG. 1

FIG. 2 is an elevational view of the cross-section of the magnetic head shown in FIG. 1. The magnetic head structure is covered by a filling layer 29.

Figure 3:
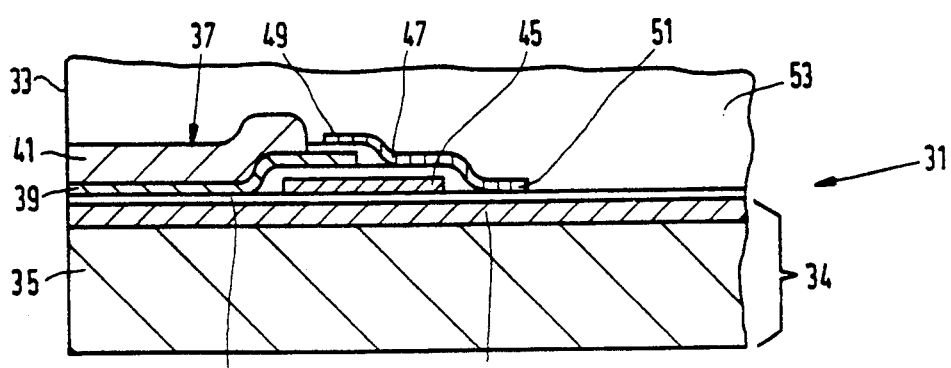
FIG. 3 is an elevational view of a cross-section of a second embodiment of the magnetic head according to the invention.

FIG. 3 shows another favorable embodiment of the magnetic head according to the invention for reading magnetic flux, which embodiment is different from that shown in FIG. 2. This magnetic head 31 has also a head face 33 and also a support 34 on which a flux guide 37 adjacent to the head face is provided. In this embodiment the support 34 comprises a non-magnetic substrate 35 on which a flux guide layer 36 is provided. The flux guide shown in this Figure also comprises a base layer 39 on which a main layer 41 is provided. An insulation layer 43 is also present between the support and the flux guide. An electric conductor 45, on which an MRE 47 is provided, is located on the support. However, now the MRE is not present between two flux guides but is coupled to the flux guide 37 by means of a coupling part 49 and to the flux guide layer 36 by means of a further coupling part 51. Consequently, the magnetic flux is directly guided from the flux guide 37 via the MRE 47 to the flux guide layer 36 instead of via a further flux guide. In this way a simpler magnetic head structure which can be manufactured at lower cost is obtained whose magnetic and electrical properties are substantially equally good as those of the first embodiment. The magnetic head structure is also covered by a covering layer 53. In both embodiments the MRE is arranged on a substrate with parts which have small height differences with respect to each other. As a result, the MRE is not completely plane but has steps which extend parallel to the head face. It has been found that this relief has a favorable influence on the stability of the MRE because a stable domain structure is produced in the MRE.

It is to be noted that the invention is not limited to the embodiments shown, but that, for example also the read part of a combined read-write head can be implemented in the manner described hereinbefore, or other embodiments which are within the scope of the invention can be realised.

I claim:

1. A magnetic head for recording and/or reproducing magnetic information in a track of a magnetic information carrier, said magnetic head including a substrate having a surface for supporting a magnetic head structure including a head face for coupling a magnetic field to said information carrier, a flux guide for coupling magnetic flux from said head face to a magnetoresistive element, said flux guide extending along said surface in the direction of said head face and comprising a main portion adjacent to said head face and a thinner end portion extending in a direction away from said head face, said main portion comprising a base layer provided on said surface and a main layer deposited on said base layer, said end portion being formed only by a portion of said base layer, which portion has a base face remote from and parallel to said surface, said magnetoresistive element extending along said surface and having a coupling part overlapping said end portion of the flux guide, said coupling part having a face opposing said base face and coupling magnetic flux from said flux guide to said magnetoresistive element.

2. The magnetic head as claimed in claim 1, wherein an insulating layer is provided between said surface of said substrate and said magnetic head structure, an electric conducting layer, for generating an auxiliary magnetic field is positioned between the insulating layer and part of the magnetoresistive element, said conducting layer extending along said magnetoresistive element in the direction of said head face, part of said magnetoresistive element extending in the direction away from said head face, unsupported by said conductive layer, directly supported by said insulation layer and having a surface parallel to, and remote from, said insulating layer for further coupling magnetic flux from said flux guide to said magnetoresistive element, and a portion of the flux guide at said coupling part having a face opposing said base face and coupling magnetic flux from said flux guide to said magnetoresistive element.

* * * * *